United States Patent Office 3,445,582
Patented May 20, 1969

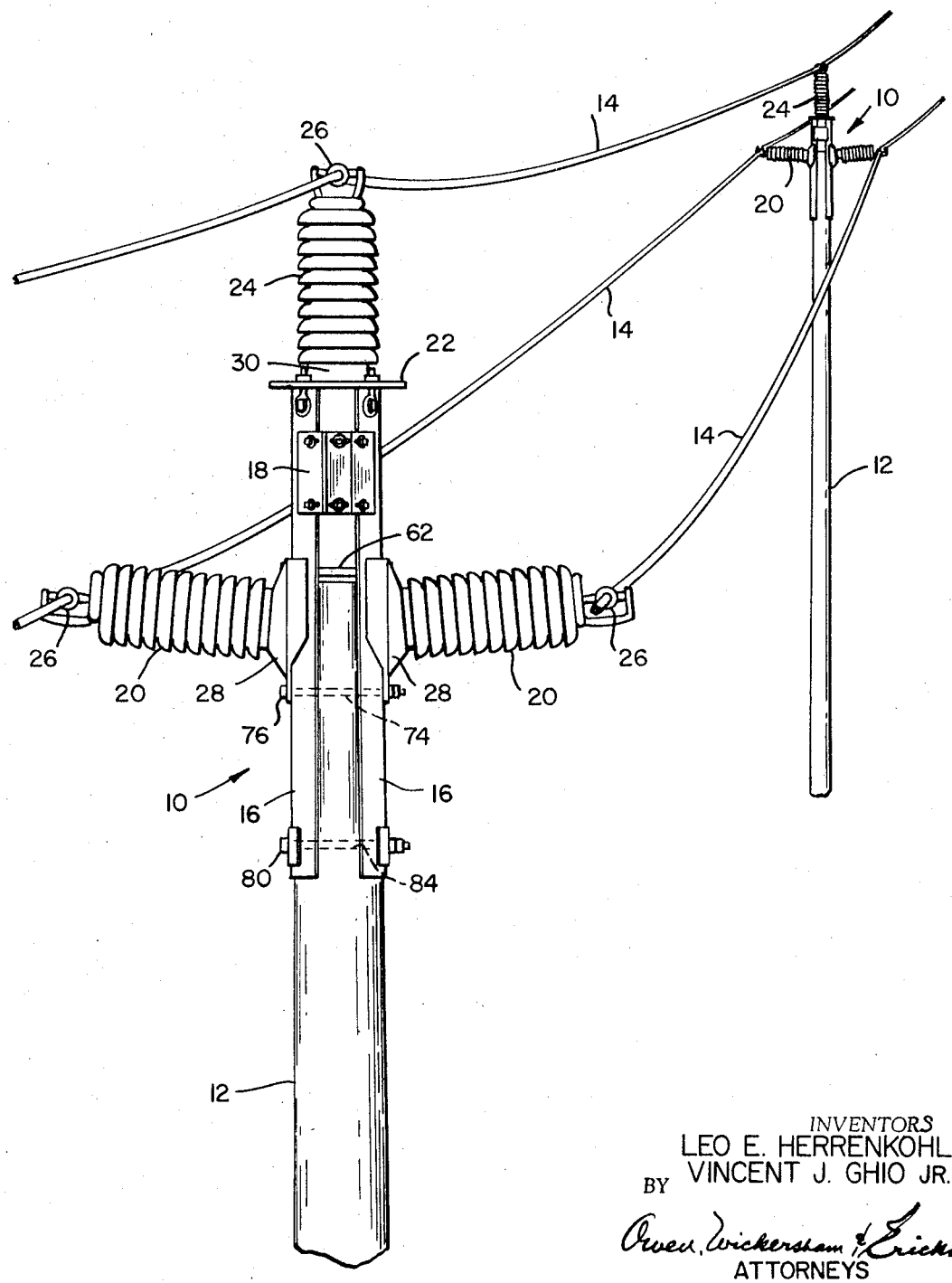

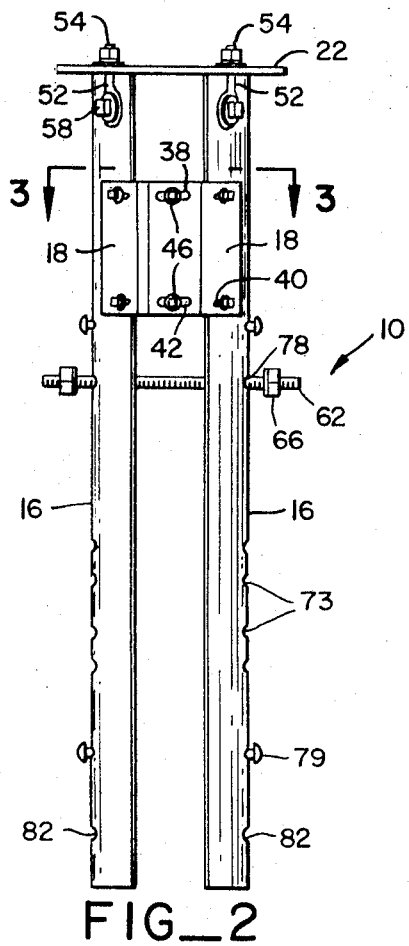
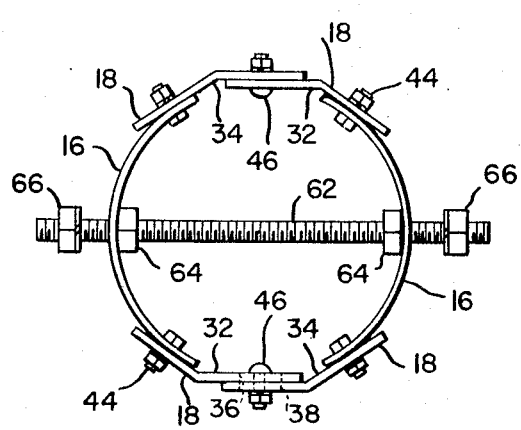
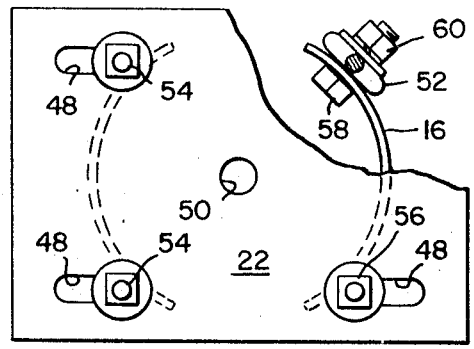
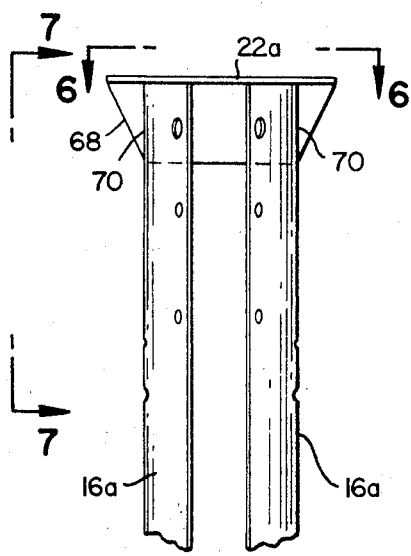
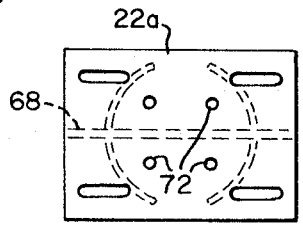
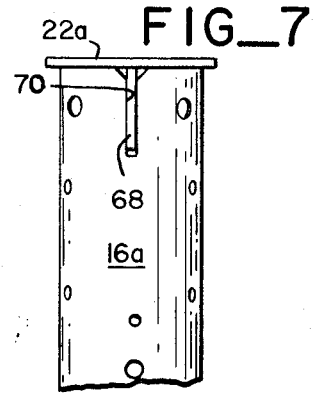

3,445,582
POLE TOP MOUNTING BRACKET FOR
ELECTRICAL TRANSMISSION LINE
Leo E. Herrenkohl, Concord, and Vincent J. Ghio, Jr.,
Greenbrae, Calif., assignors to Pacific Gas and Electric
Company, San Francisco, Calif., a corporation of
California
Filed Sept. 29, 1966, Ser. No. 582,828
Int. Cl. H02g 7/20; H01b 17/12
U.S. Cl. 174—43               10 Claims

ABSTRACT OF THE DISCLOSURE

A mounting device for supporting insulators on a power transmission pole comprising a pair of spaced apart side plates adapted to be attached to opposite sides and to extend above the top end of the pole. A pair of adjustable brace means interconnect the side plates above the pole and a support plate for one insulator is provided on top of the side plates. Means are attached by a horizontal bolt to the sides of the side plates for supporting two additional insulators which extend outwardly from the pole. The weight of lines attached to the insulators creates forces tending to clamp the side members together on the pole.

---

This invention relates to electrical power transmission lines, and more particularly it relates to a mounting device for supporting the conductors of a three-phase transmission system at the top of a transmission pole.

Electricity is usually transmitted from a generating source as three-phase power by overhead conductors supported by spaced-apart utility poles. Due to the vast increase in population and industrial growth there arose a serious need for increased load carrying capacity with existing power transmission systems. Basically, the problem prior to the present invention was to increase the voltage level and consequently the load carrying capacity of an existing transmission line, while utilizing existing utility poles and yet without increasing the height of the poles or right-of-way requirements. Heretofore, power transmission systems generally utilized the familiar construction of a pole with a crossbar of some type supporting upright or hanging insulators to which were attached the conductors of the three-phase system. The overall structural height and the right-of-way requirements for the line was determined by the minimum distance allowed commensurate with the safety requirements prescribed, the amount of swing of the insulators and the conductors, and their orientation relative to each other on the pole. Previous attempts in the prior art to support conductors on poles without using crossbars resulted in complicated devices that lacked the necessary strength to assure long trouble-free use, were expensive, difficult to install and maintain and also cumbersome and awkward in appearance. In general, the object of the present invention is to solve the aforesaid problems and to make possible an improved three-phase overhead electrical power transmission system that provides improved appearance and greater load carrying capacity; that is strong and durable and therefore safer in operation; that is easy to install and maintain; and that can be installed on existing poles without increasing the right-of-way requirements along the power line.

The aforesaid objects of the invention are accomplished by means of a unique mounting device that fits directly on top of a typical transmission pole so that its maximum height can be utilized in supporting the conductors above the ground. When installed, it is aesthetically pleasing to the eye and overcomes the cluttered look of systems heretofore devised primarily by eliminating the arms and cross-members of previous utility pole conductor supports. Instead it provides a compact and functional support installation on each pole that fits closely thereto so that only the insulators can project from the end of the pole in an eye-pleasing manner.

Another object of our invention is to provide a bracket type mount for the conductors of a three-phase electrical system on a utility pole that can be readily adjusted when assembled to fit poles having top ends of various sizes. In addition, our mounting device utilizes a unique arrangement wherein side mounting plates extend along the sides of the mounting pole and are drawn together to grip the pole. Moreover, the weight of the side projecting insulator and the conductors attached thereto is utilized to cause the side mounting plates to be urged constantly against the pole, and this action reduces loosening of the device on the pole due to wood shrinkage thereof after installation of the device. As a result of the aforesaid gripping action on the pole and other structural features, our mounting device provides a high degree of strength enabling the conductors to be held in their properly oriented positions when they are under severe mechanical loading conditions and even if they are subjected to a sudden shock load such as when the tension is suddenly released by a break in any one conductor.

Another object of the present invention is to provide a mounting device for a three-phase electrical transmission line which provides an integral electrical bond between metallic insulator supporting components. This feature eliminates the necessity for separate electrical bonding of a plurality of mounting components heretofore required in prior art devices.

Still another object of our invention is to provide a bracket type mounting device for a three-phase electrical transmission line which is easy to install with a minimum of labor and without the need for special tools. The present invention provides a unique arrangement of elements in a mounting device wherein preliminary adjustments of its components can be made on the ground before the device is lifted and mounted in place on the top of the utility pole whereupon further tightening of the device can be made.

Other objects, advantages and features of the invention will become apparent from the following detailed description thereof presented in conjunction with the accompanying drawings in which:

FIG. 1 is a view in elevation showing a pole mounting bracket for a power transmission line embodying the principles of the present invention;

FIG. 2 is a view in elevation of the pole mounting bracket of FIG. 1 without the insulation attached;

FIG. 3 is a view in section taken along line 3—3 of FIG. 2;

FIG. 4 is a top view of the mounting bracket of FIG. 2 with a portion broken away;

FIG. 5 is a fragmentary view in elevation of a slightly modified mounting bracket according to our invention;

FIG. 6 is a view in section taken along line 6—6 of FIG. 5; and

FIG. 7 is a fragmentary view in elevation taken along line 7—7 of FIG. 5.

Referring to the drawing, FIG. 1 shows our mounting device 10 as it appears when installed on a utility pole 12 for supporting the conductors 14 of a three-phase power transmission system. As shown, the device is intended for use in combination with the well-known type of utility poles having a generally cylindrical shape which are usually wooden. Such poles may vary somewhat in size and shape at their tops but as will be seen, our mounting device 10 is adjustable and can accommodate a substantial range of pole diameters.

In broad terms the bracket 10 comprises a pair of elongated side mounting plates 16 that extend above the pole and are held together nearer their upper ends by two pairs of adjustable, interlocking brace members 18. Below the latter brace members, the mounting plates provide a means for supporting a pair of side projecting insulators 20. A top plate 22 fixed to the upper ends of the mounting plates 16 supports a third or top insulator 24.

The insulators 20 and 24 supported by our device may be any of several forms of the conventional post type which are available commercially, and they do not in themselves comprise a limiting feature of the invention. Generally, they are made primarily of some non-conducting ceramic material, such as porcelain, and at their outer end each has a clamp 26 for holding a conductor 14. The base of each insulator provides a means for attaching it to the mounting device, and the side projecting insulators 20 have a base portion 28 that is thicker at one end than the other so that the insulator will extend upwardly a slight amount (e.g., 3°–5°) as well as outwardly when installed. The inner end surface of the base portion 28 for the side insulators preferably has a curvature to match that of the side mounting plates 16 and holes are provided at opposite ends of each base portion to facilitate bolting them to the side mounting plates 16. The top insulator 24 is similarly constructed, having an upper end clamp 26 for holding a conductor, and a lower base member 30 with either bolt retaining holes or studs that register with holes in the top plate 22 of the device 10.

The mounting device 10 according to our invention without the insulators attached is shown in greater detail in FIGS. 2–4. The side mounting plates 16, which may be made of sheet steel are, as shown, curved in cross section, preferably with a curvature approximating that of the poles on which the brackets are to be installed. These mounting plates 16 are drilled with the appropriate holes that are required for securing the assembled device to the pole; for securing the side insulators 20 to the mounting plates; for the brace members 18; and for attaching hooks to retain guy wires or removable steel steps that mount on the step bolts 79. The length of the side mounting plates 16 which may be between 4 to 6 times the diameter of the pole at its top is an important feature of our device 10 because it not only enables the full height of the pole to be utilized in supporting the conductors 14 above the ground, but it also contributes to its remarkable strength and stability which enables it to withstand severe loading conditions due to wind and other forces.

Four brace members 18 are utilized to hold the two mounting plates 16 together near their upper ends. As shown in FIG. 3, each of these brace members is formed from a flat piece of steel plate and is bent at a predetermined angle (e.g., 150°) to form adjacent panels 32 and 34. At the top of both panels are a pair of elongated holes 36 and 38 having a constant width and aligned horizontally, and at the bottom are a similar pair of holes 40 and 42. When the bracket is assembled, the brace members are attached near the side edges of the mouting plates 16 by a series of machine bolts 44 that extend through round holes in the mounting plates and through the elongated holes 36 and 40 of the brace members. The brace members extending from the sides of the mounting plates overlap between them so that the slotted holes 38 and 42 of their panels 34 are at least partially aligned and a pair of bolts 46 can be inserted through them to hold the brace members and thus the mounting brackets together. The length of the slotted holes 38 and 42 provide for a range of overlap of the panels 34 which enables the device to fit around poles of varying size.

The top plate 22, as shown in FIG. 4, is also formed from a sheet of steel plate and is provided with four slotted or elongated holes 48 that are parallel and located at equal distances from the center of the plate. In the embodiment of FIG. 4 another hole 50 is provided at the center of the top plate to facilitate the connection thereon of the top insulator 24 Extending upwardly through each of the slotted holes in an eyebolt 52 whose threaded portion 54 extends above the top plate and is secured by a fastener 56 such as a nut and washer combination. Below the top plate each eyebolt 52 fits over a bolt or stud 58 that projects outwardly from the surface of the side mounting plate 16 and is secured thereto by a nut 60.

It is easily seen from the foregoing that our mounting device 10 comprised of the two side mounting plates 16, the brace members 18 and the top cover 22 is easy to assemble and to adjust in size to fit various poles due to the overlapping connections and slotted connection holes.

Another important component of the bracket 10 is a crossbolt 62 that extends between aligned holes in the side mounting plates 16 and through the holes in the base portions of the tide projecting insulators 20 to hold them in place. This crossbolt 62 is provided, as seen in FIG. 3, with inside nuts 64 that serve as spacers to hold the mounting plates apart when the bracket is initially installed and permit future removal of one side insulator at a time. Additional nuts 66 are utilized on the ends of the crossbolt that extend through and outwardly from the insulator base portions.

A somewhat modified form of our bracket is shown in FIGS. 5–7. In this arrangement a top cover 22a is provided with a transverse strengthening plate 68 that is attached to and extends vertically below it. This latter vertical plate fits within a pair of aligned transverse slots 70 in the upper ends of a pair of side mounting braces 16a. This latter arrangement provides for a connection between the top cover and the mounting plates having greater bending strength and thereby adaptable to support larger insulators. Such insulators are generally attached by a plurality of bolts so more holes spaced around the center of the top plate may be provided as indicated by the numeral 72 in FIG. 6.

The installation of our bracket 10 on a utility pole that has been previously erected can be accomplished efficiently without the need for highly skilled labor and in a relatively short period of time. The first step is to assemble the side mounting plates 16 and the brace members 18 in the manner previously described and also the top cover 22, as shown in FIG. 2. Having already measured the diameter at the top of the pole on which the bracket is to be installed, the side mounting plates are set apart a slightly greater amount. This adjustment or spacing is accomplished by manipulation of the inside nuts 64 on the crossbolt 62 which has been placed in position with its ends extending through the side plates. A crane or some other means can now be used to lift the loosely assembled mounting device and place it on the top of the pole. The side plates can now be brought up snug against the sides of the pole and the side brace members can be adjusted with the proper overlap before all the bolts are tightened. The top insulator 24 is then placed in position and fastened by its base portion to the top cover 22. The side insulators 20 are now brought into position so that the crossbolt 62 extends through the hole at the upper end of the base portion for each one. The holes at the lower end of the insulator base portion are automatically aligned with lower holes 73 in the side plates. These latter holes are aligned with a transverse hole 74 that was drilled through the pole preferably at the time that its top measurement was taken. A lower crossbolt 76 is now placed through the latter aligned holes to secure the insulators at the bottom ends of their base portions. At the lower ends of the bracket a third bolt 80 providing additional gripping strength may be inserted through aligned holes 82 in the mounting plates 16 and through another transverse hole 84 drilled in the pole.

With the mounting device and the insulators installed as described, the conductors can be clamped to the ends of the insulators in the normal manner. The weight and tension of the conductors applied to the ends of the side insulators creates a force that constantly tends to bring the lower ends of the side mounting plates 16 closer together. This is an important advantage because it causes the device 10 to maintain a firm grip on the end of the pole even though the wood may shrink and swell due to environmental changes.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. A mounting device for use in combination with a generally cylindrical transmission pole for supporting three insulators each holding at its outer end one conductor of a three-phase overhead power transmission system, said device comprising:

a pair of spaced apart side plates adapted to be adjacent the opposite sides and to extend above the top end of the pole, each side plate including means for supporting an outwardly projecting insulator;
   adjustable brace means interconnecting said side plates near their upper ends and adapted to be located above the top end of the pole when said device is installed therein;
   a top means connected to said side plates and spaced above said adjustable brace means for supporting an upwardly projecting insulator; and
   a crossbolt extending transversely through and outwardly from aligned openings in said side plates below said brace means and thus above said means thereon for supporting the outwardly projecting insulators.

2. The mounting device of claim 1 wherein said side plates are curved in cross section and have a length at least 3 to 4 times the diameter of the pole.

3. The mounting device of claim 1 wherein said brace means comprises two pairs of overlapping brace plates each brace plate having a slight V-shaped cross section and connected to a side plate on one of its sides and to the adjoining brace plate of the same pair on its opposite side by fasteners through slotted openings in both of the brace plates of each pair.

4. The mounting device of claim 1 wherein said top means comprises a plate located on top of said side plates and having openings at its four corners; and eyebolts secured to said side plates and extending through said top cover openings and secured by fasteners.

5. The mounting device as described in claim 4 including a vertical transverse member fixed to the underside of said top means, and aligned slots in said side plates for receiving said transverse member.

6. The mounting device of claim 1 including a pair of spacer nuts movable axially on said crossbolt for holding said side plates apart when the mounting device is installed on top of a pole.

7. In a three-phase transmission system the combination comprising:

a plurality of poles;
   three primary phase conductors extending between said poles;
   a pair of rigid, elongated side plates on opposite sides extending above the upper top of each pole;
   bolt means extending outwardly from said side plates above lower portions of the side plates that are adapted to extend downwardly from the top of each pole;
   a pair of rigid, elongated insulators, each projecting outwardly from a said side plate substantially in a vertical plane passing through both said side plates and supporting a conductor at its outer end, and a base portion at the inner end of each insulator secured to an end of said bolt means projecting outwardly from said side plate, the weight of said insulators and the conductors connected thereto causing said side plates to grip the pole at their lower ends;
   adjustable brace means interconnecting said side plates above said bolt means;
   a top cover secured to said side plates; and
   a third upwardly projecting insulator supporting a conductor at its upper end and having a base portion fixed to said top cover.

8. The system as described in claim 7 wherein said adjustable brace means comprises:

two pairs of bent members each fixed to one side of said side plate with each said pair overlapping and joined together by fasteners through aligned elongated holes.

9. The system as described in claim 7 wherein said side plates are identical in form and are curved in a horizontal cross section to fit snugly adjacent the side of a pole.

10. The system as described in claim 7 including spacer nuts on said bolt means inside of said side plates and adjustable thereon to keep said side plates a predetermined distance apart.

References Cited

UNITED STATES PATENTS

| | | | |
|---|---|---|---|
| 3,145,259 | 8/1964 | Leonard et al. | 174—149 X |

FOREIGN PATENTS

| | | |
|---|---|---|
| 45,491 | 1/1911 | Austria. |
| 500,444 | 12/1919 | France. |
| 320,003 | 4/1920 | Germany. |
| 30,866 | 7/1920 | Norway. |

LARAMIE E. ASKIN, *Primary Examiner.*

U.S. Cl. X.R.

174—45, 149; 248—221